March 29, 1927.  1,622,278
F. R. C. BOYD
LUBRICATING OIL PURIFYING AND RECLAIMING SYSTEM
Filed Sept. 26, 1924    3 Sheets-Sheet 1
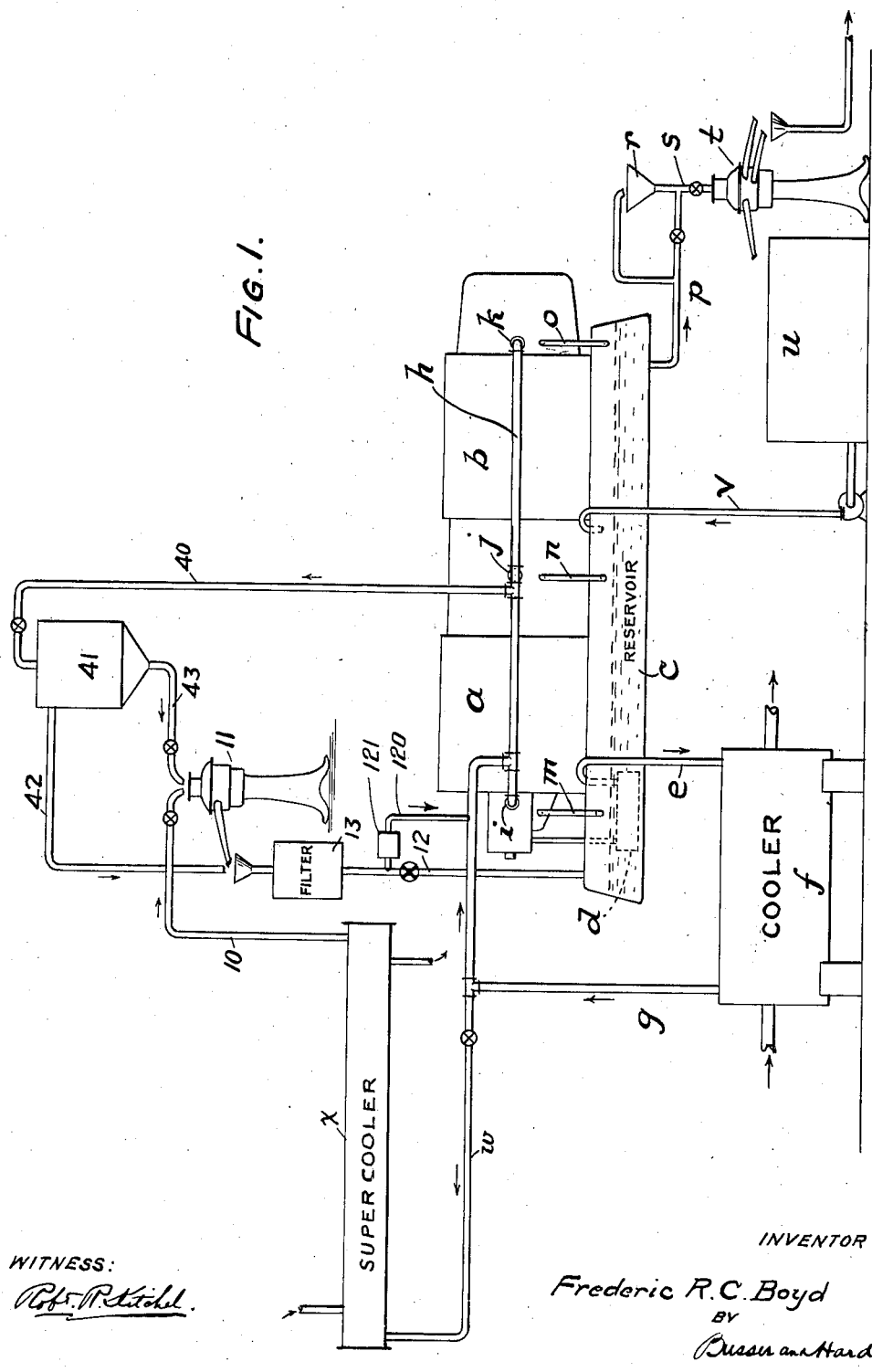
INVENTOR
Frederic R. C. Boyd
BY
Busser and Harding
ATTORNEYS.

March 29, 1927.　　　　　　　　　　　　　　　1,622,278
F. R. C. BOYD
LUBRICATING OIL PURIFYING AND RECLAIMING SYSTEM
Filed Sept. 26, 1924　　3 Sheets-Sheet 2
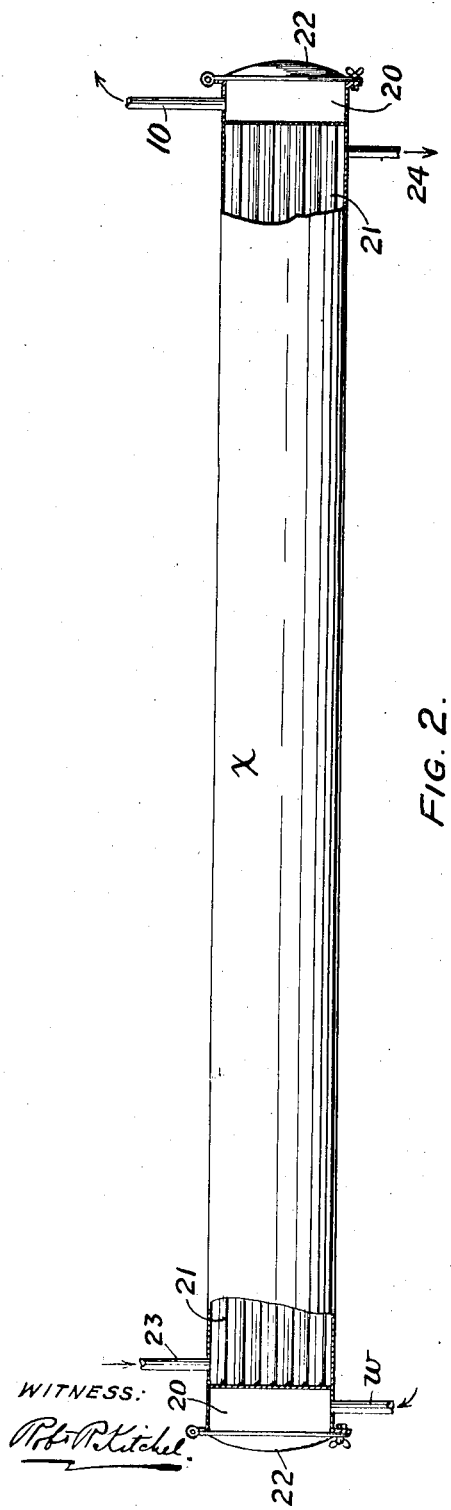
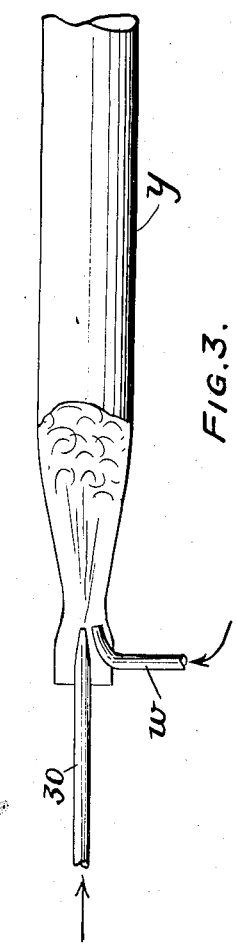
INVENTOR
Frederic R. C. Boyd
BY
ATTORNEYS.

March 29, 1927. 1,622,278
F. R. C. BOYD
LUBRICATING OIL PURIFYING AND RECLAIMING SYSTEM
Filed Sept. 26, 1924 3 Sheets-Sheet 3

WITNESS:

INVENTOR
Frederic R. C. Boyd
BY
ATTORNEYS

Patented Mar. 29, 1927.

1,622,278

UNITED STATES PATENT OFFICE.

FREDERIC R. C. BOYD, OF BOSTON, MASSACHUSETTS, ASSIGNOR TO THE DE LAVAL SEPARATOR COMPANY, OF NEW YORK, N. Y., A CORPORATION OF NEW JERSEY.

LUBRICATING-OIL PURIFYING AND RECLAIMING SYSTEM.

Application filed September 26, 1924. Serial No. 740,001.

The purification and reclaiming of lubricating oil by means of centrifugal purifiers is well known, examples of complete operative purifying and reclaiming systems embodying such method of purification being set forth in the Kennedy Patent No. 1,318,086, dated October 7, 1919, and in the Boyd & Hapgood Patent No. 1,363,833, dated December 28, 1920. In the Boyd & Hapgood patent is specifically disclosed such a system applied to turbine driven electric generators. In the Kennedy patent is specifically disclosed such a system applied to a marine engine. The Kennedy patent also discloses a cooler through which the oil from a drain tank is conveyed on its way to a gravity settling tank interposed between the drain tank and the centrifugal purifier. In any system of endless circulation of lubricating oil through engine bearings, cooling of the oil before returning it to the engine is always advisable and usually necessary.

In the centrifugal purification of used oil, it is well known that if the oil be heated, the separation of water from the oil is facilitated, and therefore the practice of centrifuging the oil at a temperature as high as, or higher than, the temperature at which it enters the engine bearings, is well established. I have discovered, however, that many impurities which cannot be centrifugally removed from oil that is at a relatively high temperature can be removed if the temperature of the oil is substantially reduced. These impurities are soluble or miscible in the oil at a high temperature but not at a lower temperature. Consequently, present methods of purification do not effect the removal of these impurities, which may be, for convenience, designated hereinafter by the popular, if not wholly accurate, name of "soluble sludge". On the other hand, the cooling of the oil to the temperature required to precipitate all the soluble sludge would make dehydration difficult or impossible. Moreover, the volume of oil continuously flowing from and to the engine bearings is so great that it would be impracticable and uneconomical to attempt to cool it through the extensive temperature range required to throw the soluble sludge out of solution. Either an impracticably long time would be required, or the cooler would have to be of an impracticably large size. Moreover, it is undesirable to run the oil to the engine bearings at the temperature to which such oil would have to be cooled to precipitate soluble sludge.

In order that the difficulties above outlined may be better appreciated, it may be said that the oil flows from the engine bearings at a temperature of from 140° to 190° F., that the desirable temperature for dehydration and for the removal of dirt and other insoluble impurities is not far from the temperature at which the oil leaves the engine bearings; that the temperature desired for the oil flowing to the bearings is about 100° to 130° F.; and that the temperature required to precipitate soluble sludge is below 80° or 90° F.; 60° or 70° F. being preferable.

According to my invention, in order to purify the oil at the different temperatures required to effectively remove water and other insoluble impurities on the one hand, and soluble sludge on the other hand, and to introduce the oil to the engine bearings at the desired temperature, and to avoid the employment of coolers of excessive capacity, I proceed as follows: The oil drained from the bearings flows into a reservoir from which the oil is continuously pumped back to the bearings. This endless system of lubrication is comparatively old in the art of engine lubrication.

In the pipe connections from the reservoir to the engine bearings is interposed a main cooler adapted to reduce the temperature of the oil (say) about 40° F. An independent endless flow of oil is established from the reservoir back to the reservoir, and in this circuit is interposed a centrifuge adapted to dehydrate the oil and to remove from it all the contained impurities that are insoluble therein at a high temperature. From the pipe connections between the main cooler and the engine bearings I arrange a by-pass adapted to divert a portion of the oil (preferably a very small proportion) to a second cooler (which I call a super-cooler) wherein the temperature of the oil is reduced to below 90° (preferably 60° to 80° F.), which throws the soluble sludge out of solution; the oil then passing to a centrifuge wherein this precipitated matter is removed and from which the purified oil is conveyed back to the reservoir.

This specific arrangement is but one of many in which my invention may be embodied. Certain practical modifications will be mentioned hereinafter; and others will suggest themselves, or may be worked out, by those skilled in the art.

From the foregoing description it will be understood that the bulk of the oil flows direct from the reservoir to the engine bearings without being subjected to any treatment other than a reduction in temperature through a comparatively small range, and that only minor proportions of the oil are diverted to the two purifiers. Bearing in mind, however, that the contamination arising from a single passage of oil through the engine bearings is very slight and that only after the oil has passed through the bearings a great number of times is there any serious contamination, it will be understood that the constant, or even intermittent, diversion of only a small proportion of oil through the purifiers will be effective to maintain the oil in a substantially pure condition.

In order that the system above described may be understood with more certainty, I have illustrated preferred apparatus in the accompanying drawings, in which—

Fig. 1 is a diagram of a complete system.

Fig. 2 is a longitudinal section through one form of supercooler.

Figure 4:
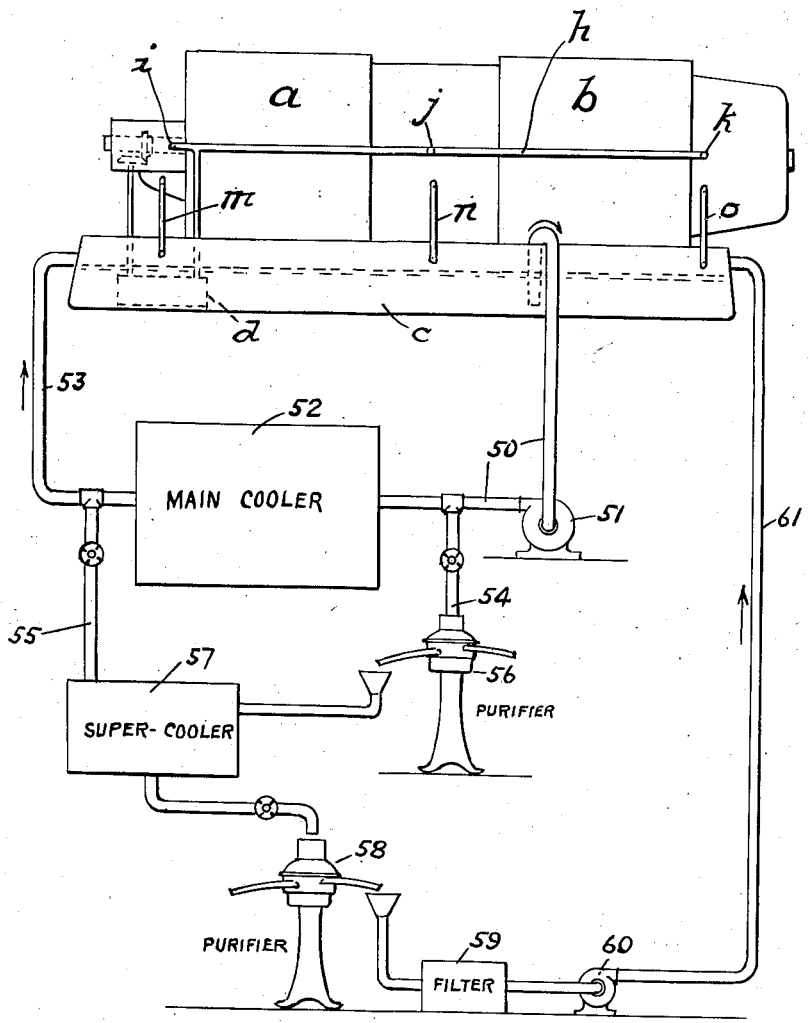

Fig 3. is a side view partly cut away of a modified supercooler.

Fig. 4 is a diagram of a modified complete system.

Referring first to Fig. 1: $a$ represents a steam turbine and $b$ an electric generator directly connected therewith. The base of the engine is adapted to act as a lubricating oil reservoir $c$. From this reservoir a pump $d$ forces oil through a pipe $e$, a main cooler $f$, a pipe $g$, and a distributing pipe $h$; connections therefrom to the several bearings being shown at $i$, $j$ and $k$. The oil escaping from the several bearings passes down pipes $m$, $n$ and $o$ to the oil reservoir $c$. The described means for storing and cooling oil and conveying it from and to the bearings is typical, but it should be understood that other arrangements are known; and any arrangement in use in any given plant may be left undisturbed.

From the reservoir extends a discharge pipe $p$, so located, preferably, that it takes out oil from the lowest level of the reservoir, where the oil is most contaminated with water or dirt or both. The pipe $p$ is of goose-neck shape and discharges, at the level of the oil in the reservoir, into a funnel $r$, communicating with a valve pipe $s$, leading to a centrifugal purifier $t$. The purifier $t$ removes the water, dirt and other insoluble impurities from the oil, which is treated at the temperature of the oil in the reservoir, say 140°–170° F. which temperature is best adapted to effect complete dehydration. The pure oil flows into a tank $u$, whence it is pumped, through pipe $v$, back to the reservoir $c$.

From the pipe $g$ extends a valved by-pass pipe $w$ to a supercooler $x$, wherein the oil is reduced to a relatively low temperature, say to 60°–80° F. In this cooler the soluble sludge is thrown out of solution, and the mixture of oil and precipitated sludge flows through a valved pipe 10, to a centrifugal purifier 11. In this centrifuge the oil is separated from its impurities. Such impurities may comprise a small percentage of insoluble matter, but the removal of this material is incidental, the purpose of the centrifuge being to separate the sludge which was dissolved in the oil before it was cooled and thrown out of solution in the supercooler $x$. From the centrifuge 11, the purified oil passes through pipe 12 back to the reservoir $c$, or, less preferably, by means of a pump 121, may be forced through a pipe 120 to pipe $w$ and thence to the engine bearings. In pipe 12 may be interposed a filter 13. Either the centrifuge 11 or the filter 13 may be eliminated, and dependence placed solely on the centrifuge or the filter to effect precipitation; or in some cases gravity may be relied on, in place of the centrifuge or the filter, or in substitution of both of them, to effect purification. In fact, it is possible, by carefully designing the supercooler, to dispense with any special subsequent purification, and rely on the cooler to retain the sludge which is precipitated therein and so act as a purifier. Indeed it is usually impossible to avoid more or less clogging of the supercooler by precipitated sludge; and the supercooler is so designed as to allow it to be readily cleaned.

The supercooler $x$ is shown in detail on Fig. 2. It comprises a long box or cylinder provided with end headers 20, 20 connected together by tubes 21. The headers communicate respectively with the oil inflow pipe $w$ and the oil outflow pipe 10. The outer wall of each header comprises a hinged cover 22. 23 is a cold water inlet and 24 a cold water outlet. By making the supercooler of sufficient length and restricting the rate of the flow of the oil therethrough, the oil can usually be cooled to a sufficient degree by water at the temperature at which it comes from the city main or other source of supply. In exceptional cases, a slight artifical cooling of the water may be desirable. More or less of the soluble sludge that is precipitated in the tubes 21 remains deposited therein. At intervals, the flow of oil through the supercooler may be arrested and the end covers 22 may be swung open, and the tubes 21 easily cleaned out, without dismantling.

It is possible, by making the supercooler $x$ of considerable length, and by providing for a sufficiently sluggish flow of oil therethrough, to deposit nearly or quite all of the precipitated sludge in the tubes 21, thereby, as above stated, dispensing with the necessity of providing any supplemental purifying means. It will be understood, therefore, that in claiming the supercooling and purification of this by-passed oil, I mean to include a supercooling which also effects substantial purification, as well as a supercooling followed by a special subsequent purification by centrifugal force, filtration or gravity, or any combination of such purifying steps. The use of a centrifuge, however, is distinctly preferred, as it is highly desirable to effect an assured elimination of all the soluble sludge, which is the most potent agent in degeneration of the oil.

It has been found that the precipitation of soluble sludge in lubricating oil can often be facilitated if the oil is brought into direct and intimate contact with cold water. In place of the supercooler $x$, I may employ a supercooler in which provision is made for such direct and intimate contact between the oil and its cooling agent. Various forms of such a supercooler may be designed by the skilled engineer. One practicable form is shown in Fig. 3, in which $y$ represents an elongated and preferably expanding tube connecting at one end with the oil inflow pipe $w$, and at the other end with the oil outflow pipe 10. Extending into the inlet end of the tube is a pipe 30 having a discharge nozzle out of which cold water under pressure is forced in the form of a fine spray, which is disseminated throughout the oil. The liquid which emerges from the cooler and sludge precipitator $y$ and which passes to the centrifuge 11 is a mixture of oil, water and precipitated sludge. The addition of water to the oil is an aid, rather than a hindrance, to the centrifugal separation of the sludge; the water acting to agglomerate the sludge and as a vehicle to facilitate the outflow of sludge from the centrifuge.

In a large installation, the use of two centrifuges is not a serious cost factor; but in a small installation, it may be found desirable to avoid the use of more than one centrifuge. Where but one centrifuge is present, the oil in pipe $s$ and the oil in pipe 10 may be conveyed to the same separator. Preferably, while oil is flowing to the centrifuge through one pipe, its flow through the other is stopped. Bearing in mind that Fig. 1 is a diagram, and not a working device, the pipes $s$ and 10 may be assumed to be fairly close one to another; or in place of flowing the relatively hot oil to be dehydrated out of the bottom of the reservoir $c$, through the pipe $p$, funnel $r$, pipes and centrifuge $t$, a part of the oil entering the distributing pipe $h$ may be by-passed through a valved pipe 40 to a settling tank 41. The outflow from tank 41 passes through pipe 42 to pipe 12. Water, dirt and the like, with some oil, settle to the bottom of the tank and this mixture passes, through pipe 43, to the centrifuge 11.

The outflow of oil from supercooler $x$ to the centrifuge 11 may be cut off while oil is flowing to the centrifuge from the settling tank 41, and vice versa. It may be possible, however, to allow both cold oil from the supercooler $x$ and heated oil from the settling tank 41 to enter the centrifuge together, as the time during which the oil from the supercooler is exposed to contact with the heated oil from the settling tank is not sufficient to effect much, if any, redissolution of the sludge in the oil.

It is not essential that the oil that has been through the main cooler $f$ shall be conveyed direct to the engine bearings. It may be much less preferably conveyed back to the reservoir $c$; and the circuit of oil from the bearings to the reservoir and thence back to the bearings may be an independent circuit. Nor is it necessary, although it is highly desirable, that the oil that goes to the supercooler $x$ shall have passed through the main cooler $f$. Such oil may go to the supercooler without first going through the main cooler, being, preferably, first centrifugally dehydrated at a high temperature. In short, a great variety of embodiments of my invention is possible. Those I have just mentioned are illustrated in Fig. 4. As in Fig. 1, $a$ is the turbine, $b$ the electric generator, $c$ the reservoir, $h$ the distributor pipe, $i$, $j$ and $k$ the several bearings connected with pipe $h$, and $m$, $n$ and $o$, the several pipes that convey oil escaping from the bearings back to the reservoir $c$.

From the reservoir an oil outflow pipe 50 (in which is interposed a pump 51) connects with a main cooler 52, from which a pipe 53 extends back to the reservoir $c$. Oil may be by-passed either from pipe 50 through pipe 54, or from pipe 53 through pipe 55, to the supercooler 57. Preferably, the oil is by-passed through pipe 54, and preferably, also, a centrifugal purifier 56 is interposed in the pipe 54, so as to dehydrate the oil, at a desirably high temperature, before it is supercooled. From the supercooler the oil flows successively through a purifier 58 and a filter 59, although either may be omitted; and is then by means of pump 60, returned, through pipe 61, to the reservoir $c$.

In those claims which specify reclaiming oil from "the bearings of an engine," I do not mean to exclude equivalent uses. For example, in the case of a direct driven generator, the oil to be purified would include the oil from the generator bearings; and in the case of a gear driven generator, the oil to be purified would include the oil from the gears,

Having now fully described my invention, what I claim and desire to protect by Letters Patent is:

1. The process of purifying and reclaiming oil from the bearings of an engine which consists in establishing a flow of oil drained from the engine and differentially cooling different fractional parts of said oil and purifying that part of the oil that has been cooled to the lower temperature.

2. The process of purifying and reclaiming oil from the bearings of an engine which consists in establishing a circulation of oil drained from the engine in two streams, cooling all the oil so circulated but cooling the oil in one stream to a temperature substantially below that to which the remainder of the oil is cooled, and purifying the oil which has been reduced to the lower temperature.

3. The process of purifying and reclaiming oil from the bearings of an engine which consists in conveying oil drained from the engine bearing to a body of oil, establishing a flow of oil from said body of oil, cooling such flowing oil, diverting from the stream of cooled oil a minor portion thereof, and cooling said diverted oil to a still lower temperature and purifying it.

4. The process of purifying and reclaiming oil from the bearings of an engine which consists in draining oil from the engine bearing, to a body of oil, establishing a flow of oil from said body of oil, splitting such flowing oil into two branches, cooling all such flowing oil but cooling the oil in one branch to a temperature substantially below that to which the remainder of the oil is cooled, and purifying the oil which has been cooled to the lower temperature, and conveying the two streams of oil, one cooled and the other cooled and purified respectively to the engine and to said body of oil.

5. The process of purifying and reclaiming oil from the bearings of an engine which consists in draining oil from the engine bearing to a body of oil, establishing a circulation of oil from said body of oil, cooling the oil so circulated, diverting a portion of the cooled oil from the main stream, cooling the diverted cooled oil to a temperature substantially below that to which the main stream of oil is cooled, and purifying the diverted oil, and conveying the main stream and diverted stream of oil respectively to the engine bearing and to said body of oil.

6. The process of purifying and reclaiming oil from the bearings of an engine which consists in draining oil from the engine bearing to a body of oil, establishing a main circuit of oil from said body of oil to the engine bearing, moderately cooling the oil in said circuit to the temperature at which it is desired to convey the oil to the engine bearing, and branching from said main circuit a minor circuit of oil of relatively small volume and supercooling it to throw out of solution impurities that are soluble at a higher temperature and separating such impurities from the oil.

7. The process of purifying and reclaiming oil from the bearings of an engine which comprises establishing a flow of oil drained from the engine and cooling such oil to a temperature sufficiently below 90° F., to throw out of solution soluble sludge and separating such sludge from the oil.

8. The process of purifying and reclaiming oil from the bearings of an engine which consists in subjecting oil drained from the engine to two purifying operations, one of which comprises cooling the oil to a temperature sufficiently below 90° F. to throw out of solution soluble sludge and separating such sludge from the oil, and the other of which comprises the removal from the oil, while at a substantially higher temperature, of the contaminating ingredients thereof that are insoluble at that temperature.

9. The process of purifying and reclaiming oil from the bearings of an engine which comprises establishing a flow of oil drained from the engine in two circuits, centrifugally purifying the oil in one of the circuits to remove therefrom the insoluble contaminating ingredients thereof, and cooling oil in the other circuit to a temperature sufficiently below 90° F. to throw out of solution soluble sludge and separating such sludge from the oil.

10. The process of purifying and reclaiming oil from the bearings of an engine which comprises establishing a flow of oil drained from the engine in two circuits, centrifugally purifying the oil in one of the circuits to remove therefrom the insoluble contaminating ingredients thereof, cooling all the oil in the other circuit but supercooling part of the oil in such other circuit to a temperature substantially below that to which the remainder of the oil in that circuit is cooled and to the temperature required to throw out of solution the soluble sludge, and separating the soluble sludge from the supercooled oil.

11. The process of purifying and reclaiming oil from the bearings of an engine which consists in draining oil from the engine bearing to a body of oil, establishing a main circuit of oil from said body of oil to the engine, moderately cooling the oil in said circuit to the temperature at which it is desired to convey the oil to the engine bearings, and establishing two other circuits of oil, in one of which the oil is cooled to a still lower temperature and purified and in the other of which the oil is centrifugally purified at a relatively high temperature.

12. The process of purifying and reclaiming oil from the bearings of an engine which consists in draining oil from the engine bearing to a body of oil, establishing a main circuit of oil from said body of oil to the engine, moderately cooling the oil in said circuit to the temperature at which it is desired to convey the oil to the engine bearings, and diverting a relatively small volume of the cooled oil and cooling it to a still lower temperature and purifying it and returning it to the body of oil, and establishing an independent circuit of relatively hot oil from and back to said body of oil and centrifugally purifying the oil in the last named circuit.

13. In an oil purifying and reclaiming system, the combination with an engine and an oil reservoir, of a cooler, a supercooler and purifier, means to circulate from the reservoir a relatively large volume of oil through the cooler to the engine, and means to circulate a relatively small volume of oil through the supercooler and purifier.

14. In a lubricating oil purifying and reclaiming apparatus, the combination with an engine; a container forming an oil reservoir; oil conveying means comprising a cooler, an inlet pipe to said cooler from said reservoir and an outlet pipe from said cooler to the engine; of a branch pipe communicating with said oil conveying means and a supercooler and purifier communicating with said branch pipe.

15. In a lubricating oil purifying and reclaiming system, the combination with an engine and an oil reservoir, of two pipes, one of which is adapted to discharge oil into said reservoir, and the other of which is adapted to carry oil back to the engine, means to convey oil from said reservoir into said two pipes, means to cool the oil adapted to so discharge through one pipe and means to supercool and purify the oil adapted to be so discharged through the other pipe.

16. In a lubricating oil purification and reclamation system, the combination with an engine and oil reservoir, and means to convey oil from said reservoir to the engine and to return drained oil to the reservoir, of two purifying means, one adapted to treat the oil at a relatively high temperature to remove insoluble impurities, and the other adapted to treat the oil at a relatively low temperature to remove impurities in solution at the higher temperature, the second purifying means comprising a supercooler.

17. In a lubricating oil purifying and reclaiming system, the combination with an engine and an oil reservoir, of two pipes adapted to discharge oil into said reservoir, means to convey oil from said reservoir into said two pipes, means to cool and purify the oil adapted to so discharge through one pipe and a centrifugal separator adapted to remove insoluble impurities from the oil adapted to so discharge through the other pipe.

18. In an oil purifying and reclaiming system, the combination with an engine and an oil reservoir, of a centrifugal purifier, a cooler, and a supercooler and purifier, means to circulate uncooled oil from the reservoir through the centrifugal purifier, and means to circulate a relatively large volume of oil from the reservoir through the cooler to the engine, and a relatively small volume of oil through the supercooler and purifier.

19. In an oil purifying and reclaiming system, the combination with an engine and an oil reservoir, of a centrifugal purifier, an endless circuit from the reservoir through said centrifugal purifier back to the reservoir, a cooler, a supercooler and purifier, a pipe connecting the reservoir and the cooler, a pipe connecting the cooler with the engine, a pipe connecting the last named pipe with the supercooler and purifier, and a pipe connection from the supercooler and purifier back to the reservoir.

20. The process of purifying and reclaiming oil from the bearings of an engine which consists in establishing a flow of oil drained from the engine and subjecting a large fractional part of said oil to cooling and mixing a smaller fractional part of the oil with water to agglomerate the sludge and subjecting such smaller fractional part to centrifugal force.

21. The process of purifying and reclaiming oil from the bearings of an engine which comprises establishing an endless circulation of oil from and back to the engine and diverting therefrom two streams, centrifugally purifying the oil in both streams, and mixing the oil in one stream, before purifying, with water at a temperature substantially below that of the oil.

22. The process of purifying and reclaiming oil from the bearings of an engine which comprises the following steps: cooling to a temperature suitable for conveyance to the engine bearings; removing at a higher temperature impurities that are insoluble at that temperature; and cooling and purifying at a temperature below that at which the oil is conveyed to the engine bearings.

In testimony of which invention, I have hereunto set my hand, at Philadelphia, Penna., on this 15th day of September, 1924.

FREDERIC R. C. BOYD.